United States Patent
Ding et al.

(10) Patent No.: US 11,482,013 B2
(45) Date of Patent: Oct. 25, 2022

(54) OBJECT TRACKING METHOD, OBJECT TRACKING APPARATUS, VEHICLE HAVING THE SAME, AND COMPUTER-PROGRAM PRODUCT

(71) Applicant: BOE Technology Group Co., Ltd., Beijing (CN)

(72) Inventors: Hongli Ding, Beijing (CN); Xiaojun Tang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 399 days.

(21) Appl. No.: 16/616,962

(22) PCT Filed: May 23, 2018

(86) PCT No.: PCT/CN2018/087971
§ 371 (c)(1),
(2) Date: Nov. 25, 2019

(87) PCT Pub. No.: WO2019/062163
PCT Pub. Date: Apr. 4, 2019

(65) Prior Publication Data
US 2020/0167578 A1    May 28, 2020

(30) Foreign Application Priority Data

Sep. 28, 2017 (CN) .......................... 201710901001.7

(51) Int. Cl.
*G06V 20/58* (2022.01)
*G06T 7/13* (2017.01)
(Continued)

(52) U.S. Cl.
CPC ............ *G06V 20/584* (2022.01); *B60R 11/04* (2013.01); *G06K 9/6227* (2013.01); *G06T 7/13* (2017.01);
(Continued)

(58) Field of Classification Search
CPC ....... G06V 20/56; G06V 20/58; G06V 20/588
See application file for complete search history.

(56) References Cited

U.S. PATENT DOCUMENTS

2003/0030546 A1*  2/2003  Tseng ..................... B60R 1/00
                                                  348/148
2004/0183906 A1*  9/2004  Nagaoka .............. G06V 40/103
                                                  348/148
(Continued)

FOREIGN PATENT DOCUMENTS

CN        101369315 A       2/2009
CN        102170558 A       8/2011
(Continued)

OTHER PUBLICATIONS

Second Office Action in the Chinese Patent Application No. 201710901001.7 dated Mar. 3, 2021; English translation attached.
(Continued)

*Primary Examiner* — Vincent Rudolph
*Assistant Examiner* — Raphael Schwartz
(74) *Attorney, Agent, or Firm* — Intellectual Valley Law, P.C.

(57) ABSTRACT

The present application provides an object tracking method. The object tracking method includes obtaining an image of an area in front of a vehicle; dividing the image of the area in the front of the vehicle into a plurality of sub-images; determining a plurality of first sub-images that satisfy a plurality of threshold conditions out of the plurality of sub-images; selecting a plurality of target sub-images out of the plurality of first sub-images, at least one of the plurality of first sub-images is not selected as one of the plurality of target sub-images; and recognizing a target object in one of the plurality of target sub-images.

20 Claims, 6 Drawing Sheets

(51) Int. Cl.
*B60R 11/04* (2006.01)
*G06K 9/62* (2022.01)
*G06V 20/56* (2022.01)

(52) U.S. Cl.
CPC ............ *G06V 20/58* (2022.01); *G06V 20/588* (2022.01); *B60R 2300/10* (2013.01)

(56) References Cited

U.S. PATENT DOCUMENTS

| | | | | |
|---|---|---|---|---|
| 2009/0067675 | A1* | 3/2009 | Tan | G06V 20/588 382/104 |
| 2010/0232639 | A1* | 9/2010 | Ibrahim | G06T 7/70 382/281 |
| 2016/0272172 | A1* | 9/2016 | Lee | B60T 8/171 |

FOREIGN PATENT DOCUMENTS

| | | |
|---|---|---|
| CN | 102288121 A | 12/2011 |
| CN | 102682455 A | 9/2012 |
| CN | 102722894 A | 10/2012 |
| CN | 103204123 A | 7/2013 |
| CN | 104346928 A | 2/2015 |
| CN | 104636724 A | 5/2015 |
| CN | 104899554 A | 9/2015 |
| CN | 105488454 A | 4/2016 |
| CN | 106682600 A | 5/2017 |
| CN | 106778886 A | 5/2017 |

OTHER PUBLICATIONS

International Search Report & Written Opinion dated Sep. 3, 2018, regarding PCT/CN2018/087971.
Wu, Z., "Monocular Vehicle Detection for Forward Collision Warning System", Full text database of China's outstanding master's Theses, Feb. 15, 2017, No. 2.
First Office Action in the Chinese Patent Application No. 201710901001.7 dated May 7, 2020; English translation attached.

* cited by examiner

OBJECT TRACKING METHOD, OBJECT TRACKING APPARATUS, VEHICLE HAVING THE SAME, AND COMPUTER-PROGRAM PRODUCT

CROSS-REFERENCE TO RELATED APPLICATION

This application is a national stage application under 35 U.S.C. § 371 of International Application No. PCT/CN2018/087971, filed May 23, 2018, which claims priority to Chinese Patent Application No. 201710901001.7, filed Sep. 28, 2017, the contents of which are incorporated by reference in the entirety.

TECHNICAL FIELD

The present invention relates to smart object-tracking technology, more particularly, to an object tracking method, an object tracking apparatus, a vehicle having the same, and a computer-program product.

BACKGROUND

In recent years, objection recognition devices for vehicular use have been developed. The objection recognition devices can be used to recognize, e.g., a moving object such as a vehicle traveling ahead of the user's vehicle, or a pedestrian. Thus, the objection recognition devices can detect a dangerous situation in its early stage, and notify the driver avoid the danger.

SUMMARY

In one aspect, the present invention provides an object tracking method, comprising obtaining an image of an area in front of a vehicle; dividing the image of the area in the front of the vehicle into a plurality of sub-images; determining a plurality of first sub-images that satisfy a plurality of threshold conditions out of the plurality of sub-images; selecting a plurality of target sub-images out of the plurality of first sub-images, at least one of the plurality of first sub-images is not selected as one of the plurality of target sub-images; and recognizing a target object in one of the plurality of target sub-images.

Optionally, the plurality of threshold conditions comprise a real distance between the target object in a sub-image and the front of the vehicle is in a first threshold distance range; a real height of the target object in the sub-image is in a threshold height range; a real width of the target object in the sub-image is in a threshold width range; and a real distance between a central point of the sub-image and one of two lateral sides of the vehicle closer to the central point of the sub-image is in a second threshold distance range.

Optionally, the object tracking method further comprises calculating the real distance between the target object in the sub-image and the front of the vehicle; calculating the real height of the target object in the sub-image; calculating the real width of the target object in the sub-image; and calculating the real distance between the central point of the sub-image and the one of two lateral sides of the vehicle closer to the central point of the sub-image.

Optionally, the image of the area in the front of the vehicle is obtained using a monocular camera on center top of the vehicle.

Optionally, the real distance between the target object in a sub-image and the front of the vehicle is determined according to Equation (1):

$$D = \frac{f_v h_c + h_c(c_v - v_{t2})\tan(\varphi)}{v_{t2} - v_0}; \qquad (1)$$

wherein D is the real distance between the target object in a sub-image and the front of the vehicle; $f_v$ is a focal length of a camera configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

Optionally, the vertical coordinate of the vanishing point of the image of the area in the front of the vehicle is determined by detecting edge image of the image of the area in the front of the vehicle using an edge detection algorithm; detecting a plurality of adjacent straight lines, extension directions of which converging with each other at a point of convergence; assigning the plurality of adjacent straight lines as a road lane; assigning the point of convergence of the extension directions of the plurality of adjacent straight lines as the vanishing point of the image of the area in the front of the vehicle; and determining the vertical coordinate of the vanishing point of the image of the area in the front of the vehicle.

Optionally, the real height of the target object in the sub-image is determined according to Equation (2):

$$H = \frac{h_t(D + h_c\tan(\varphi))}{f_v + (c_v - v_t)\tan(\varphi)}; \qquad (2)$$

wherein H is the real height of the target object in the sub-image; $h_t$ is a height of the sub-image; $h_c$ is a height of a camera configured to obtain the image of the area in the front of the vehicle relative to ground; $\varphi$ is a pitch angle of the camera configured to obtain the image of the area in the front of the vehicle; $f_v$ is a focal length of the camera configured to obtain the image of the area in the front of the vehicle; $c_v$ is a position of camera optical center; and $V_t$ is a vertical coordinate of a left upper corner of the sub-image.

Optionally, the real width of the target object in the sub-image is determined according to Equation (3):

$$W = \frac{w_t}{f_u}(D\cos(\varphi) + h_c\sin(\varphi)); \qquad (3)$$

wherein W is the real width of the target object in the sub-image; $f_u$ is a focal length of a camera configured to obtain the image of the area in the front of the vehicle; $h_c$ is a height of the camera configured to obtain the image of the area in the front of the vehicle relative to ground; D is the real distance between the target object in a sub-image and the front of the vehicle; and $\varphi$ is a pitch angle of the camera configured to obtain the image of the area in the front of the vehicle.

Optionally, the real distance between a central point of the sub-image and one of two lateral sides of the vehicle closer to the central point of the sub-image is determined according to Equation (4):

$$X = \frac{(u_{t2} - c_u)(D\cos(\varphi) + h_c\sin(\varphi))}{f_u}; \qquad (4)$$

wherein X is the real distance between a central point of the sub-image and one of two lateral sides of the vehicle closer to the central point of the sub-image; D is the real distance between the target object in a sub-image and the front of the vehicle; φ is a pitch angle of a camera configured to obtain the image of the area in the front of the vehicle; $u_{t2}$ is a horizontal coordinate of a middle point of a base of the sub-image; $c_u$ is a horizontal coordinate of camera optical center; and $h_c$ is a height of the camera configured to obtain the image of the area in the front of the vehicle relative to ground.

Optionally, recognizing the target object in one of the plurality of target sub-images comprises calculating a plurality of feature values of a plurality of image channels of the one of the plurality of target sub-images; constructing an image feature pyramid based on the plurality of feature values and obtaining image features at a plurality of scales; dividing the one of the plurality of target sub-images into a plurality of sliding windows; comparing multiple feature values of multiple image channels in each of the plurality of sliding windows with T numbers of threshold nodes of multiple weak classifiers of a stronger classifier, thereby obtaining T numbers of scores; and assigning one of the plurality of sliding windows having a sum of T numbers of scores greater than a threshold score as the target object.

Optionally, the target object comprises one or a combination of a human and a vehicle.

Optionally, the plurality of image channels comprise 3 LUV image channels, direction gradient value channels along 6 directions, and 1 image gradient magnitude channel.

Optionally, prior to recognizing the target object in one of the plurality of target sub-images, further comprising constructing the strong classifier; wherein constructing the strong classifier comprises identifying a training target in each of a plurality of training images thereby obtaining a plurality of target training areas; scaling each of the plurality of target training areas to a same size thereby obtaining a positive training example comprising a plurality of positive sample images; identifying a plurality of areas absent of a training target in the plurality of training images thereby obtaining a plurality of reference areas; scaling each of the plurality of reference areas to a same size thereby obtaining a negative training example comprising a plurality of negative sample images; and training the positive training example and the negative training example thereby obtaining the strong classifier comprising T numbers of weak classifiers; wherein the strong classifier is expressed according to Equation (5):

$$H_T = \sum_{t=1}^{T} \alpha_t h_t; \qquad (5)$$

wherein $H_T$ stands for the strong classifier; $h_t$ stands for a t-th weak classifier; $1 \le t \le T$; $\alpha_t$ is a weight of a t-th weak classifier; and T is a total number of weak classifiers.

In another aspect, the present invention provides an object tracking apparatus, comprising a camera configured to obtain an image of an area in front of a vehicle; a memory; and one or more processors; wherein the memory and the one or more processors are connected with each other; and the memory stores computer-executable instructions for controlling the one or more processors to divide the image of the area in the front of the vehicle into a plurality of sub-images; determine a plurality of first sub-images that satisfy a plurality of threshold conditions out of the plurality of sub-images; select a plurality of target sub-images out of the plurality of first sub-images, at least one of the plurality of first sub-images is not selected as one of the plurality of target sub-images; and recognize a target object in one of the plurality of target sub-images.

Optionally, the plurality of threshold conditions comprise a real distance between the target object in a sub-image and the front of the vehicle is in a first threshold distance range; a real height of the target object in the sub-image is in a threshold height range; a real width of the target object in the sub-image is in a threshold width range; and a real distance between a central point of the sub-image and one of two lateral sides of the vehicle closer to the central point of the sub-image is in a second threshold distance range.

Optionally, the memory further stores computer-executable instructions for controlling the one or more processors to calculate the real distance between the target object in the sub-image and the front of the vehicle; calculate the real height of the target object in the sub-image; calculate the real width of the target object in the sub-image; and calculate the real distance between the central point of the sub-image and the one of two lateral sides of the vehicle closer to the central point of the sub-image.

Optionally, the camera is a monocular camera on center top of the vehicle.

Optionally, the memory stores computer-executable instructions for controlling the one or more processors to calculate the real distance between the target object in the sub-image and the front of the vehicle according to Equation (1):

$$D = \frac{f_v h_c + h_c(c_v - v_{t2})\tan(\varphi)}{v_{t2} - v_0}; \qquad (1)$$

wherein D is the real distance between the target object in a sub-image and the front of the vehicle; $f_v$ is a focal length of a camera configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

Optionally, the memory stores computer-executable instructions for controlling the one or more processors to calculate the vertical coordinate of the vanishing point of the image of the area in the front of the vehicle by detecting edge image of the image of the area in the front of the vehicle using an edge detection algorithm; detecting a plurality of adjacent straight lines, extension directions of which converging with each other at a point of convergence; assigning the plurality of adjacent straight lines as a road lane; assigning the point of convergence of the extension directions of the plurality of adjacent straight lines as the vanishing point of the image of the area in the front of the vehicle; and determining the vertical coordinate of the vanishing point of the image of the area in the front of the vehicle.

Optionally, the memory stores computer-executable instructions for controlling the one or more processors to calculate the real height of the target object in the sub-image according to Equation (2):

$$H = \frac{h_t(D + h_c\tan(\varphi))}{f_v + (c_v - v_t)\tan(\varphi)}; \qquad (2)$$

wherein H is the real height of the target object in the sub-image; $h_t$ is a height of the sub-image; $h_c$ is a height of a camera configured to obtain the image of the area in the front of the vehicle relative to ground; $\varphi$ is a pitch angle of the camera configured to obtain the image of the area in the front of the vehicle; $f_v$ is a focal length of the camera configured to obtain the image of the area in the front of the vehicle; $c_v$ is a position of camera optical center; and $V_t$ is a vertical coordinate of a left upper corner of the sub-image.

Optionally, the memory stores computer-executable instructions for controlling the one or more processors to calculate the real width of the target object in the sub-image according to Equation (3):

$$W = \frac{w_t}{f_u}(D\cos(\varphi) + h_c\sin(\varphi)); \qquad (3)$$

wherein W is the real width of the target object in the sub-image; $f_u$ is a focal length of the camera configured to obtain the image of the area in the front of the vehicle; $h_c$ is a height of a camera configured to obtain the image of the area in the front of the vehicle relative to ground; D is the real distance between the target object in a sub-image and the front of the vehicle; and $\varphi$ is a pitch angle of the camera configured to obtain the image of the area in the front of the vehicle.

Optionally, the memory stores computer-executable instructions for controlling the one or more processors to calculate the real distance between a central point of the sub-image and one of two lateral sides of the vehicle closer to the central point of the sub-image according to Equation (4):

$$X = \frac{(u_{t2} - c_u)(D\cos(\varphi) + h_c\sin(\varphi))}{f_u}; \qquad (4)$$

wherein X is the real distance between a central point of the sub-image and one of two lateral sides of the vehicle closer to the central point of the sub-image; D is the real distance between the target object in a sub-image and the front of the vehicle; $\varphi$ is a pitch angle of the camera configured to obtain the image of the area in the front of the vehicle; $u_{t2}$ is a horizontal coordinate of a middle point of a base of the sub-image; $c_u$ is a horizontal coordinate of camera optical center; and $h_c$ is a height of a camera configured to obtain the image of the area in the front of the vehicle relative to ground.

Optionally, the memory further stores computer-executable instructions for controlling the one or more processors to calculate a plurality of feature values of a plurality of image channels of the one of the plurality of target sub-images; construct an image feature pyramid based on the plurality of feature values and obtaining image features at a plurality of scales; divide the one of the plurality of target sub-images into a plurality of sliding windows; compare multiple feature values of multiple image channels in each of the plurality of sliding windows with T numbers of threshold nodes of multiple weak classifiers of a stronger classifier, thereby obtaining T numbers of scores; and assign one of the plurality of sliding windows having a sum of T numbers of scores greater than a threshold score as the target object.

Optionally, the plurality of image channels comprise 3 LUV image channels, direction gradient value channels along 6 directions, and 1 image gradient magnitude channel.

Optionally, the memory further stores computer-executable instructions for controlling the one or more processors to identify a training target in each of a plurality of training images thereby obtaining a plurality of target training areas; scale each of the plurality of target training areas to a same size thereby obtaining a positive training example comprising a plurality of positive sample images; identify a plurality of areas absent of a training target in the plurality of training images thereby obtaining a plurality of reference areas; scale each of the plurality of reference areas to a same size thereby obtaining a negative training example comprising a plurality of negative sample images; and train the positive training example and the negative training example thereby obtaining the strong classifier comprising T numbers of weak classifiers; wherein the strong classifier is expressed according to Equation (5):

$$H_T = \sum_{t=1}^{T} \alpha_t h_t; \qquad (5)$$

wherein $H_T$ stands for the strong classifier; $h_t$ stands for a t-th weak classifier; $1 \le t \le T$; $\alpha_t$ is a weight of a t-th weak classifier; and T is a total number of weak classifiers.

Optionally, the target object comprises one or a combination of a human and a vehicle.

In another aspect, the present invention provides a vehicle comprising the object tracking apparatus described herein.

In another aspect, the present invention provides a computer-program product comprising a non-transitory tangible computer-readable medium having instructions thereon, the computer-readable instructions being executable by a processor to cause the processor to perform dividing an image of an area in front of a vehicle into a plurality of sub-images; determining a plurality of first sub-images that satisfy a plurality of threshold conditions out of the plurality of sub-images; selecting a plurality of target sub-images out of the plurality of first sub-images, at least one of the plurality of first sub-images is not selected as one of the plurality of target sub-images; and recognizing a target object in one of the plurality of target sub-images.

Optionally, the plurality of threshold conditions comprise a real distance between the target object in a sub-image and the front of the vehicle is in a first threshold distance range; a real height of the target object in the sub-image is in a threshold height range; a real width of the target object in the sub-image is in a threshold width range; and a real distance between a central point of the sub-image and one of two lateral sides of the vehicle closer to the central point of the sub-image is in a second threshold distance range.

Optionally, the computer-readable instructions being executable by a processor to cause the processor to perform calculating the real distance between the target object in the sub-image and the front of the vehicle; calculating the real height of the target object in the sub-image; calculating the real width of the target object in the sub-image; and calculating the real distance between the central point of the sub-image and the one of two lateral sides of the vehicle closer to the central point of the sub-image.

Optionally, the computer-readable instructions being executable by a processor to cause the processor to perform calculating the real distance between the target object in the sub-image and the front of the vehicle according to Equation (1):

$$D = \frac{f_v h_c + h_c(c_v - v_{t2})\tan(\varphi)}{v_{t2} - v_0}; \quad (1)$$

wherein D is the real distance between the target object in a sub-image and the front of the vehicle; $f_v$ is a focal length of a camera configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

Optionally, the computer-readable instructions being executable by a processor to cause the processor to perform detecting edge image of the image of the area in the front of the vehicle using an edge detection algorithm; detecting a plurality of adjacent straight lines, extension directions of which converging with each other at a point of convergence; assigning the plurality of adjacent straight lines as a road lane; assigning the point of convergence of the extension directions of the plurality of adjacent straight lines as the vanishing point of the image of the area in the front of the vehicle; and determining the vertical coordinate of the vanishing point of the image of the area in the front of the vehicle.

Optionally, the computer-readable instructions being executable by a processor to cause the processor to perform calculating the real height of the target object in the sub-image according to Equation (2):

$$H = \frac{h_t(D + h_c \tan(\varphi))}{f_v + (c_v - v_t)\tan(\varphi)}; \quad (2)$$

wherein H is the real height of the target object in the sub-image; $h_t$ is a height of the sub-image; $h_c$ is a height of a camera configured to obtain the image of the area in the front of the vehicle relative to ground; $\varphi$ is a pitch angle of the camera configured to obtain the image of the area in the front of the vehicle; $f_v$ is a focal length of the camera configured to obtain the image of the area in the front of the vehicle; $c_v$ is a position of camera optical center; and $V_t$ is a vertical coordinate of a left upper corner of the sub-image.

Optionally, the computer-readable instructions being executable by a processor to cause the processor to perform calculating the real width of the target object in the sub-image according to Equation (3):

$$W = \frac{w_t}{f_u}(D\cos(\varphi) + h_c \sin(\varphi)); \quad (3)$$

wherein W is the real width of the target object in the sub-image; $f_u$ is a focal length of a camera configured to obtain the image of the area in the front of the vehicle; $h_c$ is a height of the camera configured to obtain the image of the area in the front of the vehicle relative to ground; D is the real distance between the target object in a sub-image and the front of the vehicle; and $\varphi$ is a pitch angle of the camera configured to obtain the image of the area in the front of the vehicle.

Optionally, the computer-readable instructions being executable by a processor to cause the processor to perform calculating the real distance between a central point of the sub-image and one of two lateral sides of the vehicle closer to the central point of the sub-image according to Equation (4):

$$X = \frac{(u_{t2} - c_u)(D\cos(\varphi) + h_c \sin(\varphi))}{f_u}; \quad (4)$$

wherein X is the real distance between a central point of the sub-image and one of two lateral sides of the vehicle closer to the central point of the sub-image; D is the real distance between the target object in a sub-image and the front of the vehicle; $\varphi$ is a pitch angle of a camera configured to obtain the image of the area in the front of the vehicle; $u_{t2}$ is a horizontal coordinate of a middle point of a base of the sub-image; $c_u$ is a horizontal coordinate of camera optical center; and $h_c$ is a height of the camera configured to obtain the image of the area in the front of the vehicle relative to ground.

Optionally, the computer-readable instructions being executable by a processor to cause the processor to perform calculating a plurality of feature values of a plurality of image channels of the one of the plurality of target sub-images; constructing an image feature pyramid based on the plurality of feature values and obtaining image features at a plurality of scales; dividing the one of the plurality of target sub-images into a plurality of sliding windows; comparing multiple feature values of multiple image channels in each of the plurality of sliding windows with T numbers of threshold nodes of multiple weak classifiers of a stronger classifier, thereby obtaining T numbers of scores; and assigning one of the plurality of sliding windows having a sum of T numbers of scores greater than a threshold score as the target object.

Optionally, the plurality of image channels comprise 3 LUV image channels, direction gradient value channels along 6 directions, and 1 image gradient magnitude channel.

Optionally, the computer-readable instructions being executable by a processor to cause the processor to perform identifying a training target in each of a plurality of training images thereby obtaining a plurality of target training areas; scaling each of the plurality of target training areas to a same size thereby obtaining a positive training example comprising a plurality of positive sample images; identifying a plurality of areas absent of a training target in the plurality of training images thereby obtaining a plurality of reference areas; scaling each of the plurality of reference areas to a same size thereby obtaining a negative training example comprising a plurality of negative sample images; and training the positive training example and the negative training example thereby obtaining a strong classifier comprising T numbers of weak classifiers; wherein the strong classifier is expressed according to Equation (5):

$$H_T = \sum_{t=1}^{T} \alpha_t h_t; \quad (5)$$

wherein $H_T$ stands for the strong classifier; $h_t$ stands for a t-th weak classifier; $1 \le t \le T$; $\alpha_t$ is a weight of a t-th weak classifier; and T is a total number of weak classifiers.

Optionally, the target object comprises one or a combination of a human and a vehicle.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Many smart vehicular devices have been developed. For example, various assisted parking aid devices, and object detection and alarm devices have been developed and used. Typically, these devices use infra-red light to detect the object in front or back of the vehicle, or use a camera for the detection. When a camera is used for detecting object, object detection in a timely fashion often is quite difficult, because object tracking and recognition of the image taken by the camera is time-consuming and demands a large amount of computation.

Accordingly, the present disclosure provides, inter alia, an object tracking method, an object tracking apparatus, a vehicle having the same, and a computer-program product that substantially obviate one or more of the problems due to limitations and disadvantages of the related art. In one aspect, the present disclosure provides an object tracking method. In some embodiments, the object tracking method includes obtaining an image of an area in front of a vehicle; dividing the image of the area in the front of the vehicle into a plurality of sub-images; determining a plurality of first sub-images that satisfy a plurality of threshold conditions out of the plurality of sub-images; selecting a plurality of target sub-images out of the plurality of first sub-images, at least one of the plurality of first sub-images is not selected as one of the plurality of target sub-images; and recognizing a target object in one of the plurality of target sub-images. Optionally, the plurality of threshold conditions include a real distance between the target object in a sub-image and the front of the vehicle is in a first threshold distance range (e.g., greater than a first threshold distance); a real height of the target object in the sub-image is in a threshold height range (e.g., greater than a threshold height); a real width of the target object in the sub-image is in a threshold width range (e.g., greater than a threshold width); and a real distance between a central point of the sub-image and one of two lateral sides of the vehicle closer to the central point of the sub-image is in a second threshold distance range (e.g., greater than a second threshold distance). Optionally, the method further includes calculating the real distance between the target object in the sub-image and the front of the vehicle; calculating the real height of the target object in the sub-image; calculating the real width of the target object in the sub-image; and calculating the real distance between the central point of the sub-image and the one of two lateral sides of the vehicle closer to the central point of the sub-image.

Figure 1:
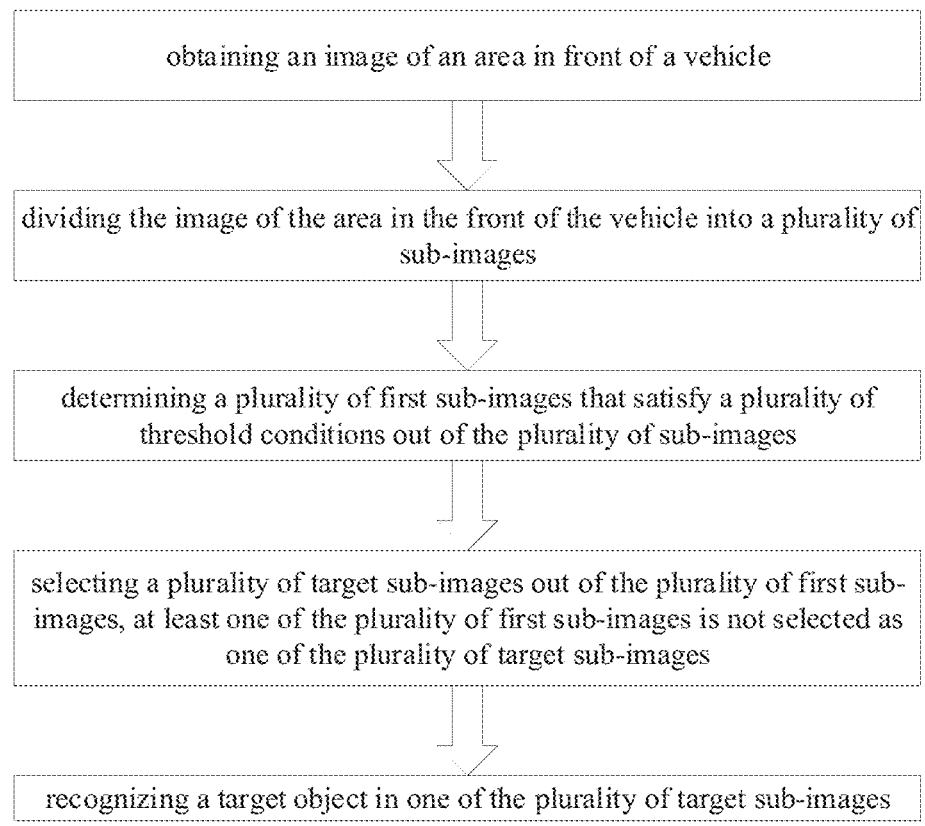
FIG. 1 is a flow chart illustrating an object tracking method in some embodiments according to the present disclosure.

FIG. 1 is a flow chart illustrating an object tracking method in some embodiments according to the present disclosure. Referring to FIG. 1, the method in some embodiments includes obtaining an image of an area in front of a vehicle; dividing the image of the area in the front of the vehicle into a plurality of sub-images; determining a plurality of first sub-images that satisfy a plurality of threshold conditions out of the plurality of sub-images; selecting a plurality of target sub-images out of the plurality of first sub-images, at least one of the plurality of first sub-images is not selected as one of the plurality of target sub-images; and recognizing a target object in one of the plurality of target sub-images. In the present object tracking method, the original image in some embodiments is obtained using a camera (e.g., a video camera). The original image includes various objects, including objects closer to the vehicle and objects more remote to the vehicle. The objects more remote to the vehicle have less effects on the driving. In some embodiments, one or more sub-images containing the objects more remote to the vehicle are excluded from the process of object recognition, thereby enhancing the computation speed in the object tracking method.

In some embodiments, the plurality of threshold conditions includes a first threshold condition, i.e., a real distance between the target object in a sub-image and the front of the vehicle is in a first threshold distance range. For example, if the real distance between the target object in a sub-image and the front of the vehicle is greater than a first threshold distance, the sub-image is determined not to satisfy the threshold condition, and is not selected as one of the plurality of first sub-images that satisfy a plurality of threshold conditions. Optionally, the first threshold distance is a distance of 50 meters.

In some embodiments, the plurality of threshold conditions includes a second threshold condition, i.e., a real height of the target object in the sub-image is in a threshold height range. For example, if the real height of an object is greater than a threshold height, the sub-image is determined not to satisfy the threshold condition, and is not selected as one of the plurality of first sub-images that satisfy a plurality of threshold conditions. Optionally, the threshold height is in a range of typical heights of a pedestrian and a vehicle. For example, a typical height of a car is in a range of 1.3 meter to 1.5 meter, a typical height of a truck is approximately 3.0 meters, and a typical height of a pedestrian is in a range of 1.3 meter to 2 meters. Optionally, the threshold height is in a range of approximately 1.3 meter to approximately 2 meters. By having a second threshold condition, e.g., limiting the real height of the target object in a range of threshold heights, an object other than a pedestrian and a vehicle is excluded from being considered as a target object.

In some embodiments, the plurality of threshold conditions includes a third threshold condition, i.e., a real width of the target object in the sub-image is in a threshold width range. For example, if the real width of an object is greater than a threshold width, the sub-image is determined not to satisfy the threshold condition, and is not selected as one of the plurality of first sub-images that satisfy a plurality of threshold conditions. Optionally, the threshold width is in a range of typical widths of a pedestrian and a vehicle. For example, a typical width of a truck is in a range of 2 meters to 3 meters. Optionally, the threshold width is in a range of approximately 2 meters to 3 meters. By having a third threshold condition, e.g., limiting the real width of the target object in a range of threshold widths, an object other than a pedestrian and a vehicle is excluded from being considered as a target object.

In some embodiments, the plurality of threshold conditions includes a fourth threshold condition, i.e., a real distance between a central point of the sub-image and one of two lateral sides of the vehicle closer to the central point of the sub-image is in a second threshold distance range. For example, if the real distance between a central point of the sub-image and one of two lateral sides of the vehicle closer to the central point of the sub-image is greater than a second threshold distance, the sub-image is determined not to satisfy the threshold condition, and is not selected as one of the plurality of first sub-images that satisfy a plurality of threshold conditions. In one example, the real distance between a central point of the sub-image and one of two lateral sides of the vehicle closer to the central point of the sub-image (e.g., the left side of the vehicle) is equal to or less than a second threshold distance, thus the object is close to the vehicle, e.g., in a same road lane. The object in the sub-image may be an object very likely would affect driving of the vehicle, thus it satisfies the fourth threshold condition. In another example, the real distance between a central point of the sub-image and one of two lateral sides of the vehicle closer to the central point of the sub-image (e.g., the left side of the vehicle) is greater than a second threshold distance, thus the object is more remote to the vehicle, e.g., in a different road lane. The object in the sub-image may be an object less likely would affect driving of the vehicle, thus it does not satisfy the fourth threshold condition. Optionally, the second threshold distance is a typical width of a road lane, e.g., 3 meters.

By having the plurality of threshold conditions, objects that have little effect on the driving are excluded from being considered as a target object. The method focuses on detection and recognition of target objects that have significant effect on the driving of the vehicle. The demand on computation power can be reduced and the computation speed in the object tracking method can be significantly enhanced.

Various appropriate apparatuses and various appropriate methods may be used for obtaining the image of the area in the front of the vehicle. Optionally, the image of the area in the front of the vehicle is obtained using a monocular camera. Optionally, the image of the area in the front of the vehicle is obtained using a binocular camera. Optionally, the image of the area in the front of the vehicle is obtained using a camera placed on top of the vehicle, e.g., on center top of the vehicle. Optionally, the camera is a camera in a vision positioning apparatus for determining a distance (e.g., the real distance between an object and the front of the vehicle). In one example, the camera is a camera in a monocular vision positioning system. In another example, the camera is a camera in a binocular vision positioning system.

In some embodiments, the method further includes calculating the real distance between the target object in the sub-image and the front of the vehicle; calculating the real height of the target object in the sub-image; calculating the real width of the target object in the sub-image; and calculating the real distance between the central point of the sub-image and the one of two lateral sides of the vehicle closer to the central point of the sub-image.

Figure 2:
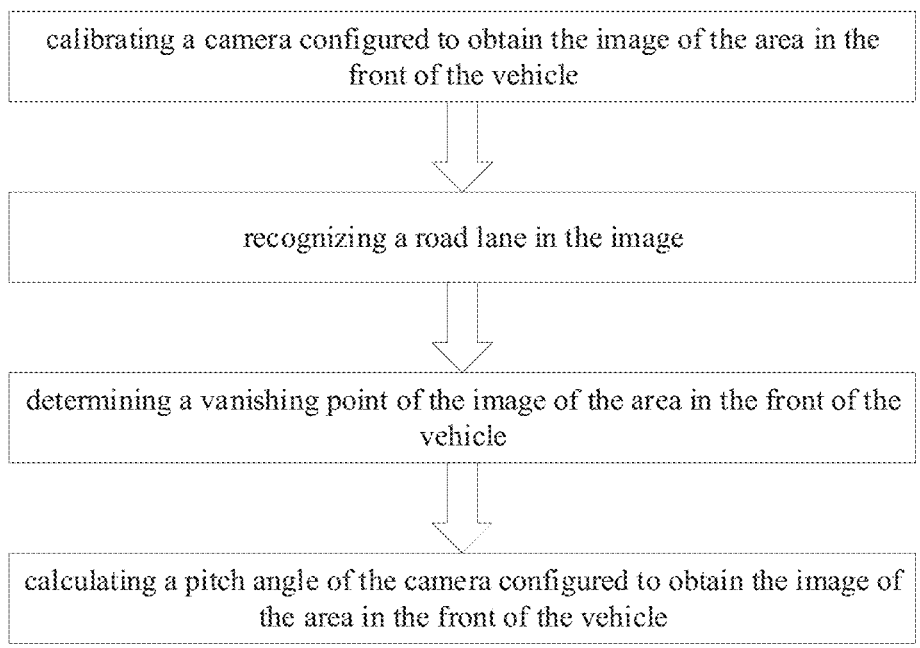
FIG. 2 is a flow chart illustrating a process of recognizing a target object in some embodiments according to the present disclosure.

FIG. 2 is a flow chart illustrating a process of recognizing a target object in some embodiments according to the present disclosure. Referring to FIG. 2, the process in some embodiments includes calibrating a camera configured to obtain the image of the area in the front of the vehicle; recognizing a road lane in the image; determining a vanishing point of the image of the area in the front of the vehicle; and calculating a pitch angle of the camera configured to obtain the image of the area in the front of the vehicle. As used herein, the term vanishing point generally refers to a point in an image to which parallel lines that are not parallel to the plane of the image, referred to herein as vanishing lines, appear to converge. A vanishing point can be formed based on the lined features in the image (e.g., edges, corners, ledges, horizontal lines, and diagonal lines), which converge towards a vanishing point. Additionally, an image can include multiple vanishing points, such as two, three, or more vanishing points.

In some embodiments, the step of calibrating the camera configured to obtain the image of the area in the front of the vehicle includes acquiring intrinsic parameters of the camera (e.g., a monocular camera). In one example, the intrinsic parameters of the camera can be expressed as a matrix (i):

$$\begin{bmatrix} f_u & 0 & c_u \\ 0 & f_v & c_v \\ 0 & 0 & 1 \end{bmatrix}; \quad (i)$$

wherein $f_u$ and $f_v$ are focal lengths measured in pixel dimensions, horizontally and vertically, respectively; and $c_u$ and $c_v$ are coordinates of the principal point which is the orthogonal projection of the optical center on the image plane. In one example, the Zhang Zhengyou checkerboard calibration algorithm is used. A checkerboard image is placed in front of the camera, and three images are taken respectively at different angles and/or positions, which are to be used as the camera calibration images. The camera calibration images are processed using the Zhang Zhengyou checkerboard calibration algorithm, thereby automatically calculating the intrinsic parameters of the camera (e.g., focal lengths $f_u$ and $f_v$, and of the principal point coordinates $c_u$ and $c_v$). In one example, the camera is a monocular camera.

In one example, a monocular camera is directly facing the front of the vehicle with a yaw angle of approximately zero. A height $h_c$ of the camera relative to ground can be measured by a ruler.

A vanishing point of the image may be obtained by extending parallel road lane lines toward an upper portion of the image to obtain a point at which the extended lines converge. The coordinates of the vanishing point so obtained are ($u_0$, $v_0$).

Figure 3:
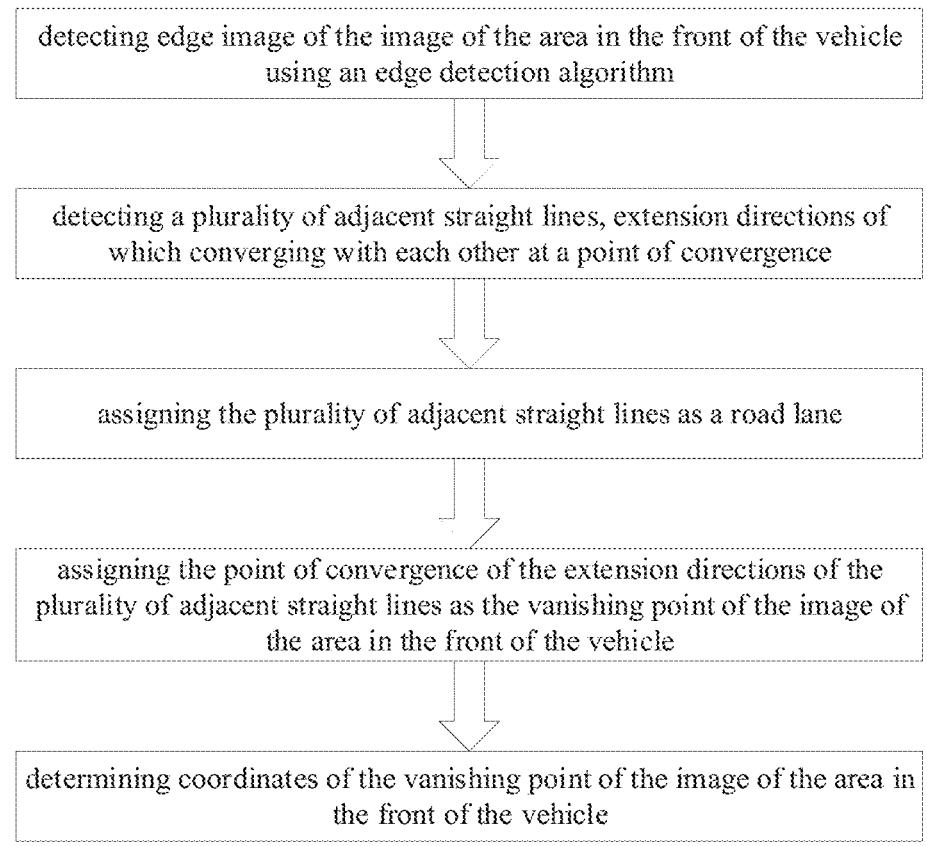
FIG. 3 is a flow chart illustrating a process of determining a position of vanishing point of an image in some embodiments according to the present disclosure.
Figure 4:
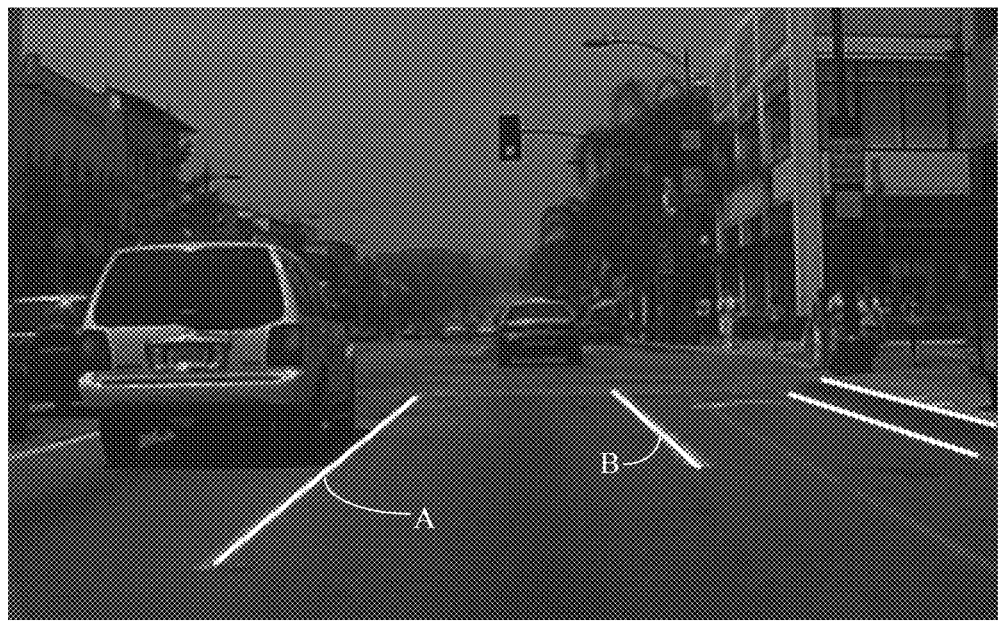
FIG. 4 illustrates an example of a road lane assigned in an image in some embodiments according to the present disclosure.
Figure 5:
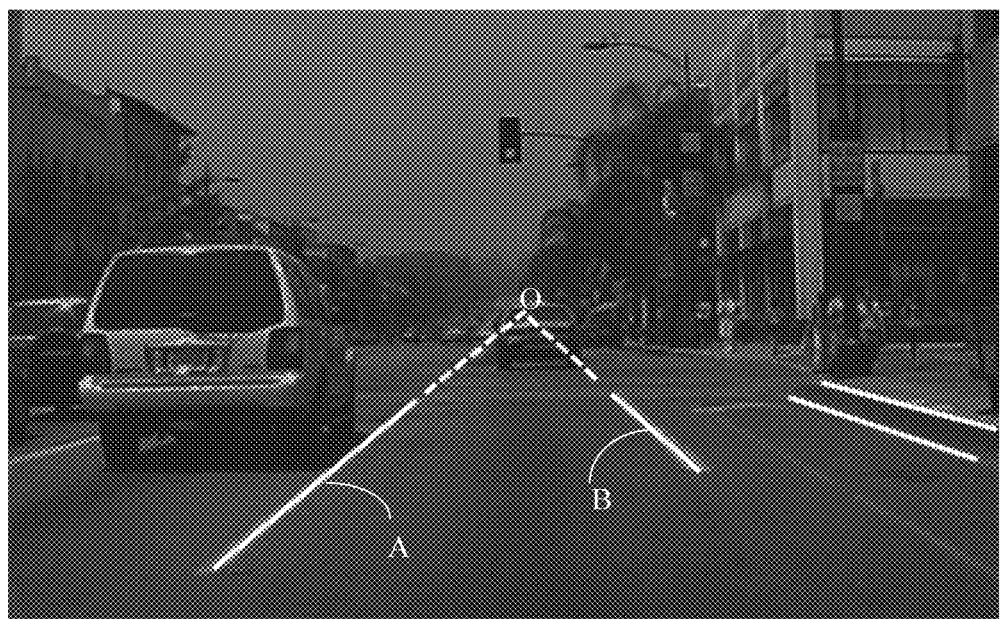
FIG. 5 illustrates an example of vanishing point determined in an image in some embodiments according to the present disclosure.

FIG. 3 is a flow chart illustrating a process of determining a position of vanishing point of an image in some embodiments according to the present disclosure. FIG. 4 illustrates an example of a road lane assigned in an image in some embodiments according to the present disclosure. FIG. 5 illustrates an example of vanishing point determined in an image in some embodiments according to the present disclosure. Referring to FIG. 3, the process in some embodiments includes detecting edge image of the image of the area in the front of the vehicle using an edge detection algorithm (e.g., a Canny edge detection algorithm); detecting a plurality of adjacent straight lines, extension directions of which converging with each other at a point of convergence (see, e.g., FIG. 4, adjacent straight lines A and B; FIG. 5, extension directions of the adjacent straight lines A and B converge with each other at a point of convergence O); assigning the plurality of adjacent straight lines as a road lane; assigning the point of convergence of the extension directions of the plurality of adjacent straight lines as the vanishing point of the image of the area in the front of the vehicle (see, e.g., FIG. 5, the point of convergence O is assigned as the vanishing point); and determining coordinates of the vanishing point of the image of the area in the front of the vehicle.

Referring to FIG. 4, a total of four straight lines were detected in the image of the area in the front of the vehicle. Straight lines A and B are adjacent to each other. Extension directions of straight lines A and B converge with each other at a point of convergence. The other two straight lines do not satisfy these conditions, e.g., the extension directions of the other two straight lines do not converge with each other. The adjacent straight lines A and B are assigned as a road lane. Optionally, the step of detecting the plurality of adjacent straight lines is performed using a Hough transform technique. Optionally, straight lines with opposite direction detected by Hough transform are assigned as the plurality of straight lines with extension directions converging with each other, e.g., a road lane.

In some embodiments, the pitch angle φ of the camera configured to obtain the image of the area in the front of the vehicle is calculated according to an Equation (ii):

$$\varphi = \arctan\left(\frac{c_v - v_0}{f_v}\right). \quad (ii)$$

Specifically, the pitch angle φ can be derived according to the following process. The coordinate (x, y, z) of a point in real space and the coordinate (u, v) of a corresponding point in the image of the area in the front of the vehicle can be converted from each other according to an Equation (iii):

$$\begin{bmatrix} u \\ v \\ 1 \end{bmatrix} = k \begin{bmatrix} f_u & 0 & c_u \\ 0 & f_v & c_v \\ 0 & 0 & 1 \end{bmatrix} \begin{bmatrix} 1 & 0 & 0 \\ 0 & 0 & -1 \\ 0 & 1 & 0 \end{bmatrix} \begin{bmatrix} 1 & 0 & 0 \\ 0 & \cos(\varphi) & -\sin(\varphi) \\ 0 & sian(\varphi) & \cos(\varphi) \end{bmatrix} \begin{bmatrix} x \\ y \\ z \end{bmatrix}; \quad (iii)$$

wherein k is a constant, and k is greater than zero.

The Equation (iii) can be simplified as an Equation (iv):

$$\begin{bmatrix} u \\ v \\ 1 \end{bmatrix} = k \begin{bmatrix} f_u & c_u\cos(\varphi) & -c_u\sin(\varphi) \\ 0 & c_u\cos(\varphi) - f_v\sin(\varphi) & -c_v\sin(\varphi) - f_v\cos(\varphi) \\ 0 & \cos(\varphi) & -\sin(\varphi) \end{bmatrix} \begin{bmatrix} x \\ y \\ z \end{bmatrix}. \quad (iv)$$

When the coordinate (x, y, z) of a point in real space is set to (0, 1, 0), the coordinate of the vanishing point of the image of the area in the front of the vehicle can be calculated according to an Equation (v):

$$\begin{bmatrix} u_0 \\ v_0 \\ 1 \end{bmatrix} = k \begin{bmatrix} c_u\cos(\varphi) \\ c_u\cos(\varphi) - f_v\sin(\varphi) \\ \cos(\varphi) \end{bmatrix}; \quad (v)$$

i.e., $u_0 = c_u$, $v_0 = c_v - f_v \tan(\varphi)$.

Thus, the pitch angle φ of the camera configured to obtain the image of the area in the front of the vehicle can be derived using the Equation (ii):

$$\varphi = \arctan\left(\frac{c_v - v_0}{f_v}\right). \quad (ii)$$

In some embodiments, the real distance between the target object in a sub-image and the front of the vehicle is determined according to Equation (1):

$$D = \frac{f_v h_c + h_c(c_v - v_{t2})\tan(\varphi)}{v_{t2} - v_0}; \quad (1)$$

wherein D is the real distance between the target object in a sub-image and the front of the vehicle; $f_v$ is a focal length of a camera (e.g., a monocular camera) configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

In some embodiments, the real height of the target object in the sub-image is determined according to Equation (2):

$$H = \frac{h_t(D + h_c\tan(\varphi))}{f_v + (c_v - v_t)\tan(\varphi)}; \quad (2)$$

wherein H is the real height of the target object in the sub-image; $h_t$ is a height of the sub-image; $h_c$ is a height of a camera configured to obtain the image of the area in the front of the vehicle relative to ground; φ is a pitch angle of the camera configured to obtain the image of the area in the front of the vehicle; $f_v$ is a focal length of the camera configured to obtain the image of the area in the front of the vehicle; $c_v$ is a position of camera optical center; and $V_t$ is a vertical coordinate of a left upper corner of the sub-image.

In some embodiments, the real width of the target object in the sub-image is determined according to Equation (3):

$$W = \frac{w_t}{f_u}(D\cos(\varphi) + h_c\sin(\varphi)); \quad (3)$$

wherein W is the real width of the target object in the sub-image; $f_u$ is a focal length of the camera configured to obtain the image of the area in the front of the vehicle; $h_c$ is a height of a camera configured to obtain the image of the area in the front of the vehicle relative to ground; D is the real distance between the target object in a sub-image and the front of the vehicle; and φ is a pitch angle of the camera configured to obtain the image of the area in the front of the vehicle.

In some embodiments, the real distance between a central point of the sub-image and one of two lateral sides of the vehicle closer to the central point of the sub-image is determined according to Equation (4):

$$X = \frac{(u_{t2} - c_u)(D\cos(\varphi) + h_c\sin(\varphi))}{f_u}; \qquad (4)$$

wherein X is the real distance between a central point of the sub-image and one of two lateral sides of the vehicle closer to the central point of the sub-image; D is the real distance between the target object in a sub-image and the front of the vehicle; φ is a pitch angle of the camera configured to obtain the image of the area in the front of the vehicle; $u_{t2}$ is a horizontal coordinate of a middle point of a base of the sub-image; $c_u$ is a horizontal coordinate of camera optical center; and $h_c$ is a height of a camera configured to obtain the image of the area in the front of the vehicle relative to ground.

Various appropriate methods may be used to recognize the target object in one of the plurality of target sub-images. In some embodiments, the step of recognizing the target object in one of the plurality of target sub-images includes calculating a plurality of feature values of a plurality of image channels of the one of the plurality of target sub-images; constructing an image feature pyramid based on the plurality of feature values and obtaining image features at a plurality of scales; dividing the one of the plurality of target sub-images into a plurality of sliding windows; comparing multiple feature values of multiple image channels in each of the plurality of sliding windows with T numbers of threshold nodes of multiple weak classifiers of a stronger classifier, thereby obtaining T numbers of scores; and assigning one of the plurality of sliding windows having a sum of T numbers of scores greater than a threshold score as the target object.

Optionally. T is 5. Optionally, each of the numbers of scores is equal to or less than 1. Optionally, the threshold core can be manually set. Optionally, the threshold core can be obtained by machine training. Optionally, the threshold core can be set to be 1.

Figure 6:
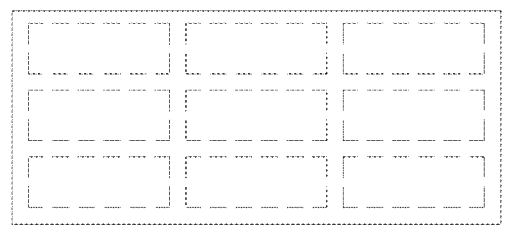
FIG. 6 illustrates an example of sliding windows in a sub-image in some embodiments according to the present disclosure.

FIG. 6 illustrates an example of sliding windows in a sub-image in some embodiments according to the present disclosure. Referring to FIG. 6, the boundary of a sub-image is shown in solid lines, and the boundaries of the sliding windows in the sub-image are shown in dashed lines.

In some embodiments, the method further includes, prior to recognizing the target object in one of the plurality of target sub-images, further comprising constructing a strong classifier, e.g., using adaboot algorithm. By constructing a strong classifier, it can be quickly determined whether the sub-image contains one or more target objects, the types of the target objects, and the number of the target objects.

Optionally, the plurality of image channels include 3 LUV image channels, direction gradient value channels along 6 directions, and 1 image gradient magnitude channel.

In some embodiments, the step of constructing the strong classifier includes identifying a training target in each of a plurality of training images thereby obtaining a plurality of target training areas; scaling each of the plurality of target training areas to a same size thereby obtaining a positive training example comprising a plurality of positive sample images; identifying a plurality of areas absent of a training target in the plurality of training images thereby obtaining a plurality of reference areas; scaling each of the plurality of reference areas to a same size thereby obtaining a negative training example comprising a plurality of negative sample images; and training the positive training example and the negative training example thereby obtaining the strong classifier comprising T numbers of weak classifiers.

Optionally, the strong classifier is expressed according to Equation (5):

$$H_T = \sum_{t=1}^{T} \alpha_t h_t; \qquad (5)$$

wherein $H_T$ stands for the strong classifier; h stands for the t-th weak classifier; 1≤t≤T; $\alpha_t$ is a weight of a t-th weak classifier; and T is a total number of weak classifiers.

Once the target object is recognized, the driver can be alerted in various ways. Optionally, the target object is displayed in a monitor, and highlighted in the displayed image (e.g., using a frame). Optionally, the driver is alerted by an audio signal, which optionally informs the driver the distance between the target object and the vehicle. Optionally, the driver is alerted by both an audio signal and a visual signal.

Figure 7:
FIG. 7 illustrates an example of target objects assigned in an image in some embodiments according to the present disclosure.

FIG. 7 illustrates an example of target objects assigned in an image in some embodiments according to the present disclosure. Referring to FIG. 7, the white frame highlights the target object. Optionally, the white frame is a sliding window. Optionally, when two sliding windows adjacent to each other both contain target objects, the white frames for the two adjacent sliding windows are merged. As a result, white frames in the image may have different sizes, as shown in FIG. 7.

In some embodiments, the target object includes one or a combination of a human and a vehicle. Optionally, the target object includes a human. Optionally, the target object includes a vehicle. Optionally, the target object includes other objects such as a tunnel and road edges.

In some embodiments, a same image is used for detecting pedestrian and for detecting vehicles. Accordingly, the computation process can be further simplified by using a same image feature pyramid for detecting pedestrian and for detecting vehicles.

In another aspect, the present disclosure provides an object tracking apparatus. In some embodiments, the object tracking apparatus includes a camera configured to obtain an image of an area in front of a vehicle; a memory; and one or more processors. In some embodiments, the memory and the one or more processors are connected with each other; and the memory stores computer-executable instructions for controlling the one or more processors to divide the image of the area in the front of the vehicle into a plurality of sub-images; determine a plurality of first sub-images that satisfy a plurality of threshold conditions out of the plurality of sub-images; select a plurality of target sub-images out of the plurality of first sub-images, at least one of the plurality of first sub-images is not selected as one of the plurality of target sub-images; and recognize a target object in one of the plurality of target sub-images. Optionally, the plurality of threshold conditions include a real distance between the target object in a sub-image and the front of the vehicle is in a first threshold distance range; a real height of the target object in the sub-image is in a threshold height range; a real width of the target object in the sub-image is in a threshold width range; and a real distance between a central point of the sub-image and one of two lateral sides of the vehicle closer to the central point of the sub-image is in a second threshold distance range. Optionally, the memory further stores computer-executable instructions for controlling the one or more processors to calculate the real distance between the target object in the sub-image and the front of the vehicle; calculate the real height of the target object in the sub-image; calculate the real width of the target object in the sub-image; and calculate the real distance between the central point of the sub-image and the one of two lateral sides of the vehicle closer to the central point of the sub-image. Optionally, the camera is a monocular camera on center top of the vehicle.

In some embodiments, the memory stores computer-executable instructions for controlling the one or more processors to calculate the real distance between the target object in the sub-image and the front of the vehicle according to Equation (1):

$$D = \frac{f_v h_c + h_c(c_v - v_{t2})\tan(\varphi)}{v_{t2} - v_0}; \quad (1)$$

wherein D is the real distance between the target object in a sub-image and the front of the vehicle; $f_v$ is a focal length of a camera configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

In some embodiments, the memory stores computer-executable instructions for controlling the one or more processors to calculate the vertical coordinate of the vanishing point of the image of the area in the front of the vehicle by detecting edge image of the image of the area in the front of the vehicle using an edge detection algorithm; detecting a plurality of adjacent straight lines, extension directions of which converging with each other at a point of convergence; assigning the plurality of adjacent straight lines as a road lane; assigning the point of convergence of the extension directions of the plurality of adjacent straight lines as the vanishing point of the image of the area in the front of the vehicle; and determining the vertical coordinate of the vanishing point of the image of the area in the front of the vehicle.

In some embodiments, the memory stores computer-executable instructions for controlling the one or more processors to calculate the real height of the target object in the sub-image according to Equation (2):

$$H = \frac{h_t(D + h_c\tan(\varphi))}{f_v + (c_v - v_t)\tan(\varphi)}; \quad (2)$$

wherein H is the real height of the target object in the sub-image; $h_t$ is a height of the sub-image; $h_c$ is a height of a camera configured to obtain the image of the area in the front of the vehicle relative to ground; $\varphi$ is a pitch angle of the camera configured to obtain the image of the area in the front of the vehicle; $f_v$ is a focal length of the camera configured to obtain the image of the area in the front of the vehicle; $c_v$ is a position of camera optical center; and $V_t$ is a vertical coordinate of a left upper corner of the sub-image.

In some embodiments, the memory stores computer-executable instructions for controlling the one or more processors to calculate the real width of the target object in the sub-image according to Equation (3):

$$W = \frac{w_t}{f_u}(D\cos(\varphi) + h_c\sin(\varphi)); \quad (3)$$

wherein W is the real width of the target object in the sub-image; $f_u$ is a focal length of the camera configured to obtain the image of the area in the front of the vehicle; $h_c$ is a height of a camera configured to obtain the image of the area in the front of the vehicle relative to ground; D is the real distance between the target object in a sub-image and the front of the vehicle; and $\varphi$ is a pitch angle of the camera configured to obtain the image of the area in the front of the vehicle.

In some embodiments, the memory stores computer-executable instructions for controlling the one or more processors to calculate the real distance between a central point of the sub-image and one of two lateral sides of the vehicle closer to the central point of the sub-image according to Equation (4):

$$X = \frac{(u_{t2} - c_u)(D\cos(\varphi) + h_c\sin(\varphi))}{f_u}; \quad (4)$$

wherein X is the real distance between a central point of the sub-image and one of two lateral sides of the vehicle closer to the central point of the sub-image; D is the real distance between the target object in a sub-image and the front of the vehicle; $\varphi$ is a pitch angle of the camera configured to obtain the image of the area in the front of the vehicle; $u_{t2}$ is a horizontal coordinate of a middle point of a base of the sub-image; $c_u$ is a horizontal coordinate of camera optical center; and $h_c$ is a height of a camera configured to obtain the image of the area in the front of the vehicle relative to ground.

In some embodiments, the memory stores computer-executable instructions for controlling the one or more processors to calculate a plurality of feature values of a plurality of image channels of the one of the plurality of target sub-images; construct an image feature pyramid based on the plurality of feature values and obtaining image features at a plurality of scales; divide the one of the plurality of target sub-images into a plurality of sliding windows; compare multiple feature values of multiple image channels in each of the plurality of sliding windows with T numbers of threshold nodes of multiple weak classifiers of a stronger classifier, thereby obtaining T numbers of scores; and assign one of the plurality of sliding windows having a sum of T numbers of scores greater than a threshold score as the target object. Optionally, the plurality of image channels include 3 LUV image channels, direction gradient value channels along 6 directions, and 1 image gradient magnitude channel.

In some embodiments, the memory further stores computer-executable instructions for controlling the one or more processors to identify a training target in each of a plurality of training images thereby obtaining a plurality of target training areas; scale each of the plurality of target training areas to a same size thereby obtaining a positive training example comprising a plurality of positive sample images; identify a plurality of areas absent of a training target in the plurality of training images thereby obtaining a plurality of reference areas; scale each of the plurality of reference areas to a same size thereby obtaining a negative training example comprising a plurality of negative sample images; and train the positive training example and the negative training example thereby obtaining the strong classifier comprising T numbers of weak classifiers.

In some embodiments, the strong classifier is expressed according to Equation (5):

$$H_T = \sum_{t=1}^{T} \alpha_t h_t; \quad (5)$$

wherein $H_T$ stands for the strong classifier; $h_t$ stands for the t-th weak classifier; $1 \leq t \leq T$; $\alpha_t$ is a weight of a t-th weak classifier; and T is a total number of weak classifiers.

Optionally, the target object comprises one or a combination of a human and a vehicle.

Figure 8:
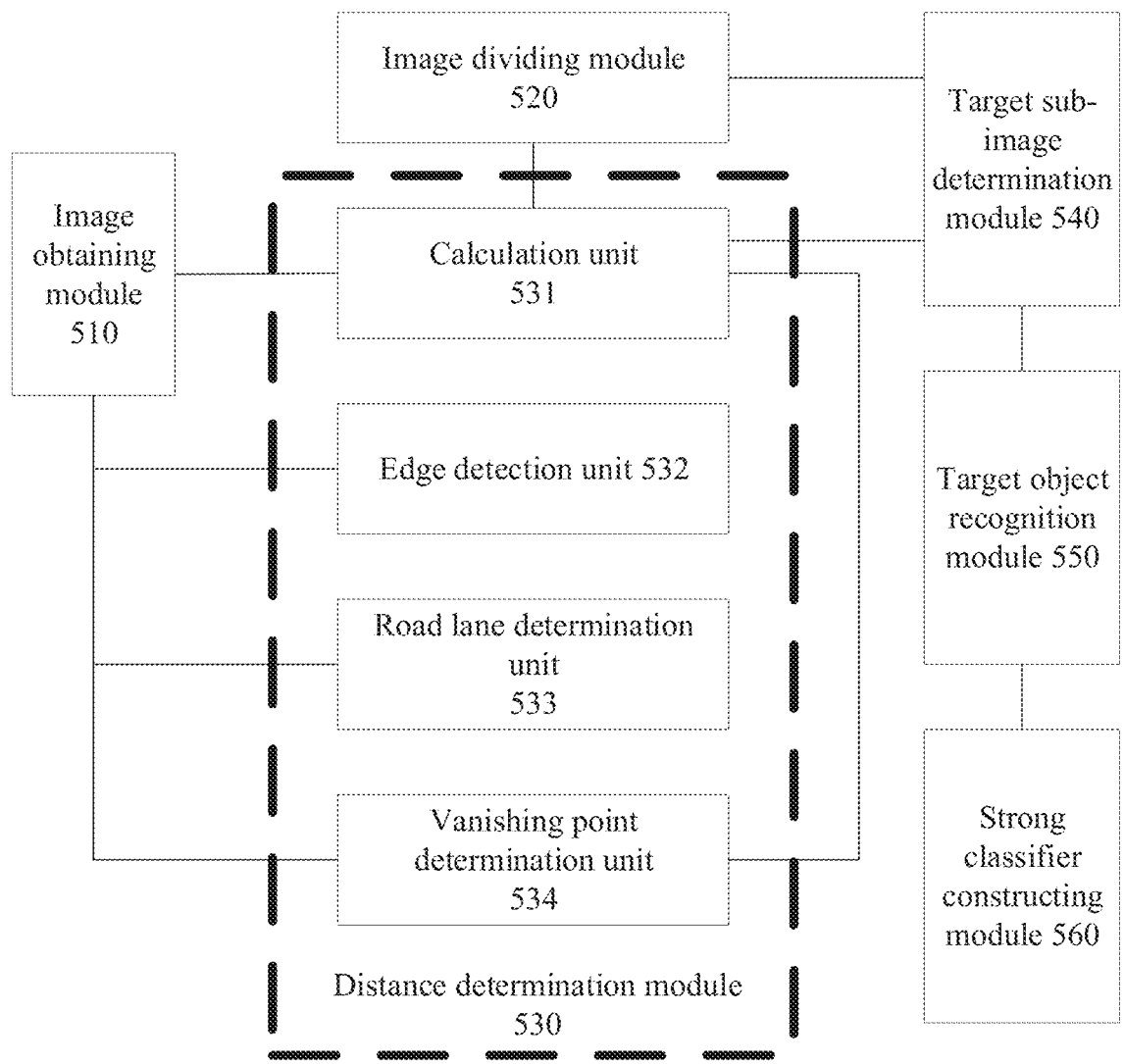
FIG. 8 is a schematic diagram illustrating the structure of an object tracking apparatus in some embodiments according to the present disclosure.

FIG. 8 is a schematic diagram illustrating the structure of an object tracking apparatus in some embodiments according to the present disclosure. Referring to FIG. 8, the object tracking apparatus in some embodiments includes an image obtaining module 510, an image dividing module 520, a distance determination module 530, a target sub-image determination module 540, and a target object recognition module 550. The object tracking apparatus is configured to execute the object tracking method described herein. The image obtaining module 510 is configured to obtain an image of an area in front of a vehicle. The image dividing module 520 is configured to divide the image of the area in the front of the vehicle into a plurality of sub-images. The distance determination module 530 and the target sub-image determination module 540 are configured to determine a plurality of first sub-images that satisfy a plurality of threshold conditions out of the plurality of sub-images, and select a plurality of target sub-images out of the plurality of first sub-images, at least one of the plurality of first sub-images is not selected as one of the plurality of target sub-images. Specifically, the distance determination module 530 includes a calculation unit 531 configured to calculate the real distance between the target object in the sub-image and the front of the vehicle; calculate the real height of the target object in the sub-image; calculate the real width of the target object in the sub-image; and calculate the real distance between the central point of the sub-image and the one of two lateral sides of the vehicle closer to the central point of the sub-image. The target sub-image determination module 540 is configured to exclude any one (e.g., a random one) or more sub-images of the plurality of first sub-images from being included in the plurality of target sub-images, and select a plurality of target sub-images out of the plurality of first sub-images. Thus, at least one of the plurality of first sub-images is not selected as one of the plurality of target sub-images. Optionally, the plurality of threshold conditions include a real distance between the target object in a sub-image and the front of the vehicle is in a first threshold distance range; a real height of the target object in the sub-image is in a threshold height range; a real width of the target object in the sub-image is in a threshold width range; and a real distance between a central point of the sub-image and one of two lateral sides of the vehicle closer to the central point of the sub-image is in a second threshold distance range.

The target object recognition module 550 is configured to recognize a target object in one of the plurality of target sub-images.

By having the plurality of threshold conditions, objects that have little effect on the driving are excluded from being considered as a target object. The method focuses on detection and recognition of target objects that have significant effect on the driving of the vehicle. The demand on computation power can be reduced and the computation speed in the object tracking method can be significantly enhanced.

Optionally, the image of the area in the front of the vehicle is obtained using a monocular camera. Optionally, the image of the area in the front of the vehicle is obtained using a binocular camera. Optionally, the image of the area in the front of the vehicle is obtained using a camera placed on top of the vehicle, e.g., on center top of the vehicle.

In some embodiments, the calculation unit 531 is configured to calculate the real distance between the target object in the sub-image and the front of the vehicle according to Equation (1). As discussed above, when calculating the real distance between the target object in a sub-image and the front of the vehicle D, it is necessary to have the coordinates of the vanishing point of the image of the area in the front of the vehicle.

In some embodiments, the distance determination module 530 further includes an edge detection unit 532, a road lane determination unit 533, and a vanishing point determination unit 534. The edge detection unit 532 is configured to detect edge image of the image of the area in the front of the vehicle using an edge detection algorithm. The road lane determination unit 533 is configured to detect a plurality of adjacent straight lines, extension directions of which converging with each other at a point of convergence, and assign the plurality of adjacent straight lines as a road lane. The vanishing point determination unit 534 is configured to assign the point of convergence of the extension directions of the plurality of adjacent straight lines as the vanishing point of the image of the area in the front of the vehicle, and determine the coordinate of the vanishing point of the image of the area in the front of the vehicle.

In some embodiments, the calculation unit 531 is configured to calculate the real height of the target object in the sub-image according to Equation (2). In some embodiments, the calculation unit 531 is configured to calculate the real width of the target object in the sub-image according to Equation (3). In some embodiments, the calculation unit 531 is configured to calculate the real distance between a central point of the sub-image and one of two lateral sides of the vehicle closer to the central point of the sub-image according to Equation (4).

In some embodiments, the target object recognition module 550 includes an image channel feature value calculation unit 551, an image feature pyramid construction unit 552, a sliding window dividing unit 553, and a target object assigning unit 554.

In some embodiments, the image channel feature value calculation unit 551 is configured to calculate a plurality of feature values of a plurality of image channels of the one of the plurality of target sub-images. In some embodiments, the image feature pyramid construction unit 552 is configured to construct an image feature pyramid based on the plurality of feature values and obtaining image features at a plurality of scales. In some embodiments, the sliding window dividing unit 553 is configured to divide the one of the plurality of target sub-images into a plurality of sliding windows. In some embodiments, the target object assigning unit 554 is configured to compare multiple feature values of multiple image channels in each of the plurality of sliding windows with T numbers of threshold nodes of multiple weak classifiers of a stronger classifier, thereby obtaining T numbers of scores, and assign one of the plurality of sliding windows having a sum of T numbers of scores greater than a threshold score as the target object.

In some embodiments, the object tracking apparatus further includes a strong classifier constructing module 560. Optionally, the strong classifier constructing module 560 includes a training target identifier 561, a positive example training unit 562, a reference area identifier 563, a negative example training unit 564, and a strong classifier calculation unit 565.

The training target identifier 561 is configured to identify a training target in each of a plurality of training images thereby obtaining a plurality of target training areas. The positive example training unit 562 is configured to scale each of the plurality of target training areas to a same size thereby obtaining a positive training example comprising a plurality of positive sample images. The reference area identifier 563 is configured to identify a plurality of areas absent of a training target in the plurality of training images thereby obtaining a plurality of reference areas. The negative example training unit 564 is configured to scale each of the plurality of reference areas to a same size thereby obtaining a negative training example comprising a plurality of negative sample images. The strong classifier calculation unit 565 is configured to train the positive training example and the negative training example thereby obtaining the strong classifier comprising T numbers of weak classifiers.

In some embodiments, strong classifier is expressed according to Equation (5):

$$H_T = \sum_{t=1}^{T} \alpha_t h_t; \tag{5}$$

wherein $H_T$ stands for the strong classifier; $h_t$ stands for the t-th weak classifier; $1 \leq t \leq T$; $\alpha_t$ is a weight of a t-th weak classifier; and T is a total number of weak classifiers.

Optionally, the plurality of image channels includes 3 LUV image channels, direction gradient value channels along 6 directions, and 1 image gradient magnitude channel.

Optionally, the target object includes one or a combination of a human and a vehicle.

In another aspect, the present disclosure further provides a vehicle having the object tracking apparatus described herein.

In another aspect, the present disclosure further provides a computer-program product comprising a non-transitory tangible computer-readable medium having instructions thereon, the computer-readable instructions being executable by a processor to cause the processor to perform dividing an image of an area in front of a vehicle into a plurality of first sub-images; determining a plurality of first sub-images that satisfy a plurality of threshold conditions out of the plurality of sub-images; selecting a plurality of target sub-images out of the plurality of first sub-images, at least one of the plurality of first sub-images is not selected as one of the plurality of target sub-images; and recognizing a target object in one of the plurality of target sub-images. Optionally, the plurality of threshold conditions include a real distance between the target object in a sub-image and the front of the vehicle is in a first threshold distance range; a real height of the target object in the sub-image is in a threshold height range; a real width of the target object in the sub-image is in a threshold width range; and a real distance between a central point of the sub-image and one of two lateral sides of the vehicle closer to the central point of the sub-image is in a second threshold distance range.

In some embodiments, the computer-readable instructions being executable by a processor to cause the processor to perform calculating the real distance between the target object in the sub-image and the front of the vehicle; calculating the real height of the target object in the sub-image; calculating the real width of the target object in the sub-image; and calculating the real distance between the central point of the sub-image and the one of two lateral sides of the vehicle closer to the central point of the sub-image.

In some embodiments, the computer-readable instructions being executable by a processor to cause the processor to perform calculating the real distance between the target object in the sub-image and the front of the vehicle according to Equation (1):

$$D = \frac{f_v h_c + h_c(c_v - v_{t2})\tan(\varphi)}{v_{t2} - v_0}; \tag{1}$$

wherein D is the real distance between the target object in a sub-image and the front of the vehicle; $f_v$ is a focal length of a camera configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

In some embodiments, the computer-readable instructions being executable by a processor to cause the processor to perform detecting edge image of the image of the area in the front of the vehicle using an edge detection algorithm; detecting a plurality of adjacent straight lines, extension directions of which converging with each other at a point of convergence; assigning the plurality of adjacent straight lines as a road lane; assigning the point of convergence of the extension directions of the plurality of adjacent straight lines as the vanishing point of the image of the area in the front of the vehicle; and determining the vertical coordinate of the vanishing point of the image of the area in the front of the vehicle.

In some embodiments, the computer-readable instructions being executable by a processor to cause the processor to perform calculating the real height of the target object in the sub-image according to Equation (2):

$$H = \frac{h_t(D + h_c\tan(\varphi))}{f_v + (c_v - v_t)\tan(\varphi)}; \tag{2}$$

wherein H is the real height of the target object in the sub-image; $h_t$ is a height of the sub-image; $h_c$ is a height of a camera configured to obtain the image of the area in the front of the vehicle relative to ground; $\varphi$ is a pitch angle of the camera configured to obtain the image of the area in the front of the vehicle; $f_v$ is a focal length of the camera configured to obtain the image of the area in the front of the vehicle; $c_v$ is a position of camera optical center; and $V_t$ is a vertical coordinate of a left upper corner of the sub-image.

In some embodiments, the computer-readable instructions being executable by a processor to cause the processor to perform calculating the real width of the target object in the sub-image according to Equation (3):

$$W = \frac{w_t}{f_u}(D\cos(\varphi) + h_c\sin(\varphi));\qquad(3)$$

wherein W is the real width of the target object in the sub-image; $f_u$ is a focal length of the camera configured to obtain the image of the area in the front of the vehicle; $h_c$ is a height of a camera configured to obtain the image of the area in the front of the vehicle relative to ground; D is the real distance between the target object in a sub-image and the front of the vehicle; and $\varphi$ is a pitch angle of the camera configured to obtain the image of the area in the front of the vehicle.

In some embodiments, the computer-readable instructions being executable by a processor to cause the processor to perform calculating the real distance between a central point of the sub-image and one of two lateral sides of the vehicle closer to the central point of the sub-image according to Equation (4):

$$X = \frac{(u_{t2} - c_u)(D\cos(\varphi) + h_c\sin(\varphi))}{f_u};\qquad(4)$$

wherein X is the real distance between a central point of the sub-image and one of two lateral sides of the vehicle closer to the central point of the sub-image; D is the real distance between the target object in a sub-image and the front of the vehicle; $\varphi$ is a pitch angle of the camera configured to obtain the image of the area in the front of the vehicle; $u_{t2}$ is a horizontal coordinate of a middle point of a base of the sub-image; $c_u$ is a horizontal coordinate of camera optical center; and $h_c$ is a height of a camera configured to obtain the image of the area in the front of the vehicle relative to ground.

In some embodiments, the computer-readable instructions being executable by a processor to cause the processor to perform calculating a plurality of feature values of a plurality of image channels of the one of the plurality of target sub-images; constructing an image feature pyramid based on the plurality of feature values and obtaining image features at a plurality of scales; dividing the one of the plurality of target sub-images into a plurality of sliding windows; comparing multiple feature values of multiple image channels in each of the plurality of sliding windows with T numbers of threshold nodes of multiple weak classifiers of a stronger classifier, thereby obtaining T numbers of scores; and assigning one of the plurality of sliding windows having a sum of T numbers of scores greater than a threshold score as the target object. Optionally, the plurality of image channels include 3 LUV image channels, direction gradient value channels along 6 directions, and 1 image gradient magnitude channel.

In some embodiments, the computer-readable instructions being executable by a processor to cause the processor to perform identifying a training target in each of a plurality of training images thereby obtaining a plurality of target training areas; scaling each of the plurality of target training areas to a same size thereby obtaining a positive training example comprising a plurality of positive sample images; identifying a plurality of areas absent of a training target in the plurality of training images thereby obtaining a plurality of reference areas; scaling each of the plurality of reference areas to a same size thereby obtaining a negative training example comprising a plurality of negative sample images; and training the positive training example and the negative training example thereby obtaining the strong classifier comprising T numbers of weak classifiers.

In some embodiments, the strong classifier is expressed according to Equation (5):

$$H_T = \sum_{t=1}^{T} \alpha_t h_t;\qquad(5)$$

wherein $H_T$ stands for the strong classifier; $h_t$ stands for the t-th weak classifier; $1 \leq t \leq T$; $\alpha_t$ is a weight of a t-th weak classifier; and T is a total number of weak classifiers.

Optionally, the target object comprises one or a combination of a human and a vehicle.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An object tracking method, comprising:
   obtaining an image of an area in front of a vehicle;
   dividing the image of the area in the front of the vehicle into a plurality of sub-images;

determining a plurality of first sub-images that satisfy a plurality of threshold conditions out of the plurality of sub-images;

selecting a plurality of target sub-images out of the plurality of first sub-images, at least one of the plurality of first sub-images is not selected as one of the plurality of target sub-images; and recognizing a target object in one of the plurality of target sub-images;

wherein the plurality of threshold conditions comprise:
a real distance between the target object in a sub-image and the front of the vehicle is in a first threshold distance range;
a real height of the target object in the sub-image is in a threshold height range;
a real width of the target object in the sub-image is in a threshold width range; and
a real distance between a central point of the sub-image and one of two lateral sides of the vehicle closer to the central point of the sub-image is in a second threshold distance range;

wherein the real distance between the target object in a sub-image and the front of the vehicle is determined according to Equation (1):

$$D = \frac{f_v h_c + h_c(c_v - v_{t2})\tan(\varphi)}{v_{t2} - v_0}; \quad (1)$$

wherein D is the real distance between the target object in a sub-image and the front of the vehicle; $f_v$ is a focal length of a camera configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

2. The object tracking method of claim 1, further comprising:
calculating the real distance between the target object in the sub-image and the front of the vehicle;
calculating the real height of the target object in the sub-image;
calculating the real width of the target object in the sub-image; and
calculating the real distance between the central point of the sub-image and the one of two lateral sides of the vehicle closer to the central point of the sub-image.

3. The object tracking method of claim 1, wherein the image of the area in the front of the vehicle is obtained using a monocular camera on center top of the vehicle.

4. The object tracking method of claim 1, wherein the vertical coordinate of the vanishing point of the image of the area in the front of the vehicle is determined by:
detecting edge image of the image of the area in the front of the vehicle using an edge detection algorithm;
detecting a plurality of adjacent straight lines, extension directions of which converging with each other at a point of convergence;
assigning the plurality of adjacent straight lines as a road lane;
assigning the point of convergence of the extension directions of the plurality of adjacent straight lines as the vanishing point of the image of the area in the front of the vehicle; and determining the vertical coordinate of the vanishing point of the image of the area in the front of the vehicle.

5. The object tracking method of claim 1, wherein the real height of the target object in the sub-image is determined according to Equation (2):

$$H = \frac{h_t(D + h_c \tan(\varphi))}{f_v + (c_v - v_t)\tan(\varphi)}; \quad (2)$$

wherein H is the real height of the target object in the sub-image; $h_t$ is a height of the sub-image; $h_c$ is a height of a camera configured to obtain the image of the area in the front of the vehicle relative to ground; $\varphi$ is a pitch angle of the camera configured to obtain the image of the area in the front of the vehicle; $f_v$ is a focal length of the camera configured to obtain the image of the area in the front of the vehicle; $c_v$ is a position of camera optical center; and $V_t$ is a vertical coordinate of a left upper corner of the sub-image.

6. The object tracking method of claim 1, wherein the real width of the target object in the sub-image is determined according to Equation (3):

$$W = \frac{w_t}{f_u}(D\cos(\varphi) + h_c\sin(\varphi)); \quad (3)$$

wherein W is the real width of the target object in the sub-image; $f_u$ is a focal length of a camera configured to obtain the image of the area in the front of the vehicle; $h_c$ is a height of the camera configured to obtain the image of the area in the front of the vehicle relative to ground; D is the real distance between the target object in a sub-image and the front of the vehicle; and $\varphi$ is a pitch angle of the camera configured to obtain the image of the area in the front of the vehicle.

7. The object tracking method of claim 1, wherein the real distance between a central point of the sub-image and one of two lateral sides of the vehicle closer to the central point of the sub-image is determined according to Equation (4):

$$X = \frac{(u_{t2} - c_u)(D\cos(\varphi) + h_c\sin(\varphi))}{f_u}; \quad (4)$$

wherein X is the real distance between a central point of the sub-image and one of two lateral sides of the vehicle closer to the central point of the sub-image; D is the real distance between the target object in a sub-image and the front of the vehicle; $\varphi$ is a pitch angle of a camera configured to obtain the image of the area in the front of the vehicle; $u_{t2}$ is a horizontal coordinate of a middle point of a base of the sub-image; $c_u$ is a horizontal coordinate of camera optical center; and $h_c$ is a height of the camera configured to obtain the image of the area in the front of the vehicle relative to ground.

8. The object tracking method of claim 1, wherein recognizing the target object in one of the plurality of target sub-images comprises:
calculating a plurality of feature values of a plurality of image channels of the one of the plurality of target sub-images;

constructing an image feature pyramid based on the plurality of feature values and obtaining image features at a plurality of scales;

dividing the one of the plurality of target sub-images into a plurality of sliding windows;

comparing multiple feature values of multiple image channels in each of the plurality of sliding windows with T numbers of threshold nodes of multiple weak classifiers of a stronger classifier, thereby obtaining T numbers of scores; and assigning one of the plurality of sliding windows having a sum of T numbers of scores greater than a threshold score as the target object.

9. The object tracking method of claim 8, wherein the plurality of image channels comprise 3 LUV image channels, direction gradient value channels along 6 directions, and 1 image gradient magnitude channel.

10. The object tracking method of claim 8, prior to recognizing the target object in one of the plurality of target sub-images, further comprising constructing the strong classifier;

wherein constructing the strong classifier comprises:

identifying a training target in each of a plurality of training images thereby obtaining a plurality of target training areas;

scaling each of the plurality of target training areas to a same size thereby obtaining a positive training example comprising a plurality of positive sample images;

identifying a plurality of areas absent of a training target in the plurality of training images thereby obtaining a plurality of reference areas;

scaling each of the plurality of reference areas to a same size thereby obtaining a negative training example comprising a plurality of negative sample images; and training the positive training example and the negative training example thereby obtaining the strong classifier comprising T numbers of weak classifiers;

wherein the strong classifier is expressed according to Equation (5):

$$H_T = \sum_{t=1}^{T} \alpha_t h_t; \qquad (5)$$

wherein $H_T$ stands for the strong classifier; $h_t$ stands for a t-th weak classifier; $1 \leq t \leq T$; $\alpha_t$ is a weight of a t-th weak classifier; and T is a total number of weak classifiers.

11. The object tracking method of claim 1, wherein the target object comprises one or a combination of a human and a vehicle.

12. An object tracking apparatus, comprising:
a camera configured to obtain an image of an area in front of a vehicle;
a memory; and
one or more processors;
wherein the memory and the one or more processors are connected with each other; and
the memory stores computer-executable instructions for controlling the one or more processors to:
divide the image of the area in the front of the vehicle into a plurality of sub-images;
determine a plurality of first sub-images that satisfy a plurality of threshold conditions out of the plurality of sub-images;

select a plurality of target sub-images out of the plurality of first sub-images, at least one of the plurality of first sub-images is not selected as one of the plurality of target sub-images; and recognize a target object in one of the plurality of target sub-images;

wherein the plurality of threshold conditions comprise:
a real distance between the target object in a sub-image and the front of the vehicle is in a first threshold distance range;
a real height of the target object in the sub-image is in a threshold height range;
a real width of the target object in the sub-image is in a threshold width range; and
a real distance between a central point of the sub-image and one of two lateral sides of the vehicle closer to the central point of the sub-image is in a second threshold distance range;

wherein the memory stores computer-executable instructions for controlling the one or more processors to calculate the real distance between the target object in the sub-image and the front of the vehicle according to Equation (1):

$$D = \frac{f_v h_c + h_c(c_v - v_{t2})\tan(\varphi)}{v_{t2} - v_0}; \qquad (1)$$

wherein D is the real distance between the target object in a sub-image and the front of the vehicle; $f_v$ is a focal length of a camera configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

13. The object tracking apparatus of claim 12, wherein the memory further stores computer-executable instructions for controlling the one or more processors to:
calculate the real distance between the target object in the sub-image and the front of the vehicle;
calculate the real height of the target object in the sub-image;
calculate the real width of the target object in the sub-image; and
calculate the real distance between the central point of the sub-image and the one of two lateral sides of the vehicle closer to the central point of the sub-image.

14. The object tracking apparatus of claim 12, wherein the camera is a monocular camera on center top of the vehicle.

15. A vehicle, comprising the object tracking apparatus of claim 12.

16. A computer-program product comprising a non-transitory tangible computer-readable medium having instructions thereon, the computer-readable instructions being executable by a processor to cause the processor to perform:
dividing an image of an area in front of a vehicle into a plurality of sub-images;
determining a plurality of first sub-images that satisfy a plurality of threshold conditions out of the plurality of sub-images;
selecting a plurality of target sub-images out of the plurality of first sub-images, at least one of the plurality of first sub-images is not selected as one of the plurality of target sub-images; and recognizing a target object in one of the plurality of target sub-images;
wherein the plurality of threshold conditions comprise:
a real distance between the target object in a sub-image and the front of the vehicle is in a first threshold distance range;
a real height of the target object in the sub-image is in a threshold height range;
a real width of the target object in the sub-image is in a threshold width range; and
a real distance between a central point of the sub-image and one of two lateral sides of the vehicle closer to the central point of the sub-image is in a second threshold distance range;
wherein the computer-readable instructions being executable by a processor to cause the processor to perform calculating the real distance between the target object in the sub-image and the front of the vehicle according to Equation (1):

$$D = \frac{f_v h_c + h_c(c_v - v_{t2})\tan(\varphi)}{v_{t2} - v_0}; \quad (1)$$

wherein D is the real distance between the target object in a sub-image and the front of the vehicle; $f_v$ is a focal length of a camera configured to obtain the image of the area in the front of the vehicle; $h_c$ is a height of the camera relative to ground; $c_v$ is a position of camera optical center; $V_{t2}$ is a vertical coordinate of a middle point of a base of the sub-image; $v_0$ is a vertical coordinate of a vanishing point of the image of the area in the front of the vehicle.

17. The computer-program product of claim 16, wherein the computer-readable instructions being executable by a processor to cause the processor to perform:
calculating the real distance between the target object in the sub-image and the front of the vehicle;
calculating the real height of the target object in the sub-image;
calculating the real width of the target object in the sub-image; and
calculating the real distance between the central point of the sub-image and the one of two lateral sides of the vehicle closer to the central point of the sub-image.

18. The computer-program product of claim 16, wherein the computer-readable instructions being executable by a processor to cause the processor to perform calculating the real height of the target object in the sub-image according to Equation (2):

$$H = \frac{h_t(D + h_c \tan(\varphi))}{f_v + (c_v - v_t)\tan(\varphi)}; \quad (2)$$

wherein H is the real height of the target object in the sub-image; $h_t$ is a height of the sub-image; $h_c$ is a height of a camera configured to obtain the image of the area in the front of the vehicle relative to ground; $\varphi$ is a pitch angle of the camera configured to obtain the image of the area in the front of the vehicle; $f_v$ is a focal length of the camera configured to obtain the image of the area in the front of the vehicle; $c_v$ is a position of camera optical center; and $V_t$ is a vertical coordinate of a left upper corner of the sub-image.

19. The computer-program product of claim 16, wherein the computer-readable instructions being executable by a processor to cause the processor to perform calculating the real width of the target object in the sub-image according to Equation (3):

$$W = \frac{w_t}{f_u}(D\cos(\varphi) + h_c\sin(\varphi)); \quad (3)$$

wherein W is the real width of the target object in the sub-image; $f_u$ is a focal length of a camera configured to obtain the image of the area in the front of the vehicle; $h_c$ is a height of the camera configured to obtain the image of the area in the front of the vehicle relative to ground; D is the real distance between the target object in a sub-image and the front of the vehicle; and $\varphi$ is a pitch angle of the camera configured to obtain the image of the area in the front of the vehicle.

20. The computer-program product of claim 16, wherein the computer-readable instructions being executable by a processor to cause the processor to perform calculating the real distance between a central point of the sub-image and one of two lateral sides of the vehicle closer to the central point of the sub-image according to Equation (4):

$$X = \frac{(u_{t2} - c_u)(D\cos(\varphi) + h_c\sin(\varphi))}{f_u}; \quad (4)$$

wherein X is the real distance between a central point of the sub-image and one of two lateral sides of the vehicle closer to the central point of the sub-image; D is the real distance between the target object in a sub-image and the front of the vehicle; $\varphi$ is a pitch angle of a camera configured to obtain the image of the area in the front of the vehicle; $u_{t2}$ is a horizontal coordinate of a middle point of a base of the sub-image; $c_u$ is a horizontal coordinate of camera optical center; and $h_c$ is a height of the camera configured to obtain the image of the area in the front of the vehicle relative to ground.

* * * * *